(12) United States Patent
Garrec et al.

(10) Patent No.: US 8,886,373 B2
(45) Date of Patent: Nov. 11, 2014

(54) SYSTEM AND METHOD FOR ASSISTING IN THE DECKING OF AN AIRCRAFT

(75) Inventors: Patrick Garrec, Merignac (FR); Pascal Cornic, Brest (FR); Eric Barraux, Brest (FR)

(73) Assignee: Thales, Neuilly sur Seine (FR)

( * ) Notice: Subject to any disclaimer, the term of this patent is extended or adjusted under 35 U.S.C. 154(b) by 665 days.

(21) Appl. No.: 12/753,787

(22) Filed: Apr. 2, 2010

(65) Prior Publication Data

US 2010/0256841 A1 Oct. 7, 2010

(30) Foreign Application Priority Data

Apr. 3, 2009 (FR) ...................................... 09 01645

(51) Int. Cl.
| | |
|---|---|
| G06F 19/00 | (2011.01) |
| G06G 7/70 | (2006.01) |
| G01S 13/82 | (2006.01) |
| G01S 13/87 | (2006.01) |
| G01S 13/91 | (2006.01) |
| G05D 1/06 | (2006.01) |

(52) U.S. Cl.
CPC ................ *G01S 13/82* (2013.01); *G01S 13/878* (2013.01); *G01S 13/913* (2013.01); *G05D 1/0684* (2013.01)
USPC .......................................................... 701/17

(58) Field of Classification Search
CPC ..... G01S 13/82; G01S 13/913; G01S 13/878; G05D 1/0684
USPC ............................................................ 701/17
See application file for complete search history.

(56) References Cited

U.S. PATENT DOCUMENTS

| | | | |
|---|---|---|---|
| 7,994,964 B2 * | 8/2011 | Cornic et al. ................... | 342/38 |
| 2005/0102072 A1 * | 5/2005 | Deakin ........................... | 701/21 |
| 2009/0055038 A1 | 2/2009 | Garrec et al. | |
| 2009/0243911 A1 | 10/2009 | Cornic et al. | |
| 2009/0315755 A1 | 12/2009 | Cornic et al. | |

FOREIGN PATENT DOCUMENTS

| | | |
|---|---|---|
| FR | 2 727 082 A1 | 5/1996 |
| FR | 2 836 554 A1 | 8/2003 |
| WO | 2006/053868 A1 | 5/2006 |
| WO | 2007/063126 A1 | 6/2007 |
| WO | 2007/131923 * | 11/2007 |
| WO | 2007/131923 A1 | 11/2007 |
| WO | 2008/113750 A1 | 9/2008 |

* cited by examiner

*Primary Examiner* — Maceeh Anwari
(74) *Attorney, Agent, or Firm* — Baker Hostetler LLP

(57) ABSTRACT

The present invention relates to a system and a method for assisting in the decking of an aircraft on a platform, more particularly on a mobile platform comprising a decking surface, said aircraft comprising a signal transmitter, the system comprising means for determining flight commands to be executed by the aircraft, said means being at least fed by locating means of the aircraft and by means of predicting movements of the platform, the locating means comprising at least two passive sensors, spaced apart, fixed in proximity to the decking surface and able to receive the signals transmitted by the aircraft. The invention applies notably to the decking of rotary wing craft and autonomous aircraft on ships.

13 Claims, 7 Drawing Sheets

SYSTEM AND METHOD FOR ASSISTING IN THE DECKING OF AN AIRCRAFT

CROSS-REFERENCE TO RELATED APPLICATIONS

This application claims priority to foreign France patent application No. 0901645, filed on Apr. 3, 2009, the disclosure of which is hereby incorporated by reference in its entirety.

FIELD OF THE INVENTION

The present invention relates to a system and a method for assisting in the decking of an aircraft on a platform, more particularly on a mobile platform. This applies notably to the decking of autonomous aircraft on ships.

BACKGROUND OF THE INVENTION

For the landing of aircraft, a number of well known automatic guidance systems have been implemented. The automatic guidance of an aircraft involves accurately determining the current position of the aircraft in order to automatically correct, if necessary, its trajectory to align it correctly with a landing runway for example. This determination of the current position of the aircraft can be performed using different systems.

Among these systems, the best known are the ILS (instrument landing system) systems. The ILS systems are instrument approach systems for aircraft that are equipped therewith. The ILS system makes it possible to indicate to the pilot the manoeuvres to be performed to achieve a successful landing. These systems therefore require specific instrumentation onboard the aircraft and detection and guidance systems on the ground.

Another guidance system employed at airports is the MLS (Microwave Landing System). The MLS is a microwave landing system. It makes it possible to provide accurate guidance for a landing, regardless of the weather conditions.

The ILS and MLS systems are very heavy equipment, both on the ground and onboard the aircraft. Also, it is not possible to envisage installing such equipment on a small platform such as a ship. Furthermore, light aircraft cannot incorporate the equipment needed to implement these systems, as much for reasons of cost as for lack of space.

Apart from these conventional means that are mainly used by commercial civil aviation, other solutions can be envisaged.

A first solution uses a satellite positioning system, this type of system being commonly designated by the acronym GNSS (Global Navigation Satellite System). Among these positioning systems, the GPS (Global Positioning System) system is, these days, the most widely used. The main drawback of the GNSS systems is their lack of robustness. In practice, this type of service is not always available and is sensitive to electromagnetic disturbances.

A second solution is to use a LIDAR (Light Detection And Ranging) system. This locating system, which operates on the same principle as radars, uses lasers in the visible range, or even in the infrared range. This therefore renders it inoperative when the weather conditions are unfavourable.

Another solution consists in using a highly directional millimetric wave radar. The millimetric wave radar also requires a search phase to designate the target. It must also be positioned accurately relative to the landing runway. This solution is also very costly and often requires a transponder onboard the aircraft. The transponder is itself costly, bulky, heavy, and consumes a lot of energy. It is also essential to make it redundant for dependability reasons.

Other locating methods that facilitate the automatic guidance of the aircraft have been proposed in the past. Notable among these are the international patent applications referenced under the respective numbers WO2006/053868, WO2007/063126, which notably use a radar and a multifunction beacon onboard the aircraft.

However, the latter methods are similarly difficult to apply in the case of a decking on a mobile platform such as a ship or an oil platform, especially when the environmental conditions are unfavourable. For example, in the case of a rough sea, the aircraft may have to land on a surface that is subject to strong roll, pitch, heave, surge and/or sway movements, making the decking operation difficult, or even hazardous. Furthermore, the structure of the platform can cause turbulent winds to appear around the aircraft.

Furthermore, the solutions that employ a conventional radar require a transmission of a signal from the platform that is of sufficiently high power to receive the skin echo from the aircraft. These solutions are incompatible with the constraints of electromagnetic compatibility and possible electromagnetic discretion requirements.

Guidance techniques that use optical sensors such as infrared or optical, thermal or laser cameras can also be implemented. However, these techniques are not compatible when the aim is to be able to perform a decking regardless of the visibility conditions, and notably in misty weather.

Moreover, although the international patent applications referenced under the numbers WO2007/131923 and WO2008/113750 address the problem of multiple paths of waves deriving from reflections on the decking surface which, for example, is a ship's metal deck, the presence of side walls reflecting the electromagnetic waves in proximity to the decking area can lead to the appearance of other multiple paths of waves that can also disrupt the measurements. Now, on ships for example, the presence of such walls is possible.

SUMMARY OF THE INVENTION

One aim of the invention is notably to overcome the above-mentioned drawbacks by proposing an accurate and discrete system for assisting in the decking of an aircraft on a mobile platform. To this end, the subject of the invention is a system for assisting in the decking of an aircraft on a mobile platform comprising a decking surface, said aircraft comprising a signal transmitter, the system comprising means for determining flight commands to be executed by the aircraft, said means being at least fed by locating means of the aircraft and by prediction means able to extrapolate the movements of the platform, the locating means comprising at least two passive sensors spaced apart, fixed in proximity to the decking surface and able to receive the signals transmitted by the aircraft.

The system according to the invention makes it possible to provide accurate and discrete aircraft guidance. The mobile platform can, for example, be a barge, a ship, an oil platform. The term "passive sensor" should be understood to mean a sensor that does not transmit signals or that transmits low power signals—for example, with a power sufficient to transmit data to the aircraft during its approach phase, but very much less than the powers used by the radars to provide active detection. The sensors are spaced apart by a distance that makes it possible to locate the aircraft by triangulation.

According to one embodiment of the system according to the invention for which the decking surface of the platform reflects the electromagnetic waves, each sensor is a panel fixed in a plane that is substantially orthogonal to the decking surface, a panel on which a number of antenna receivers are distributed in the two dimensions of said panel.

This embodiment makes it possible notably to guide the aircraft in all weathers. The signal transmitted by the aircraft is, for example, a narrowband radiofrequency signal so as to obtain an interference signal in the form of a sinusoid on the antenna panel. The distribution of several antennas on a panel makes it possible to perform a spatial sampling on the amplitude of the interference signal received on a substantially vertical axis, which makes it possible to determine the position of the aircraft despite the presence of multiple wave paths due to the reflections on the decking surface.

The antenna receivers of the panel can be planar antennas assembled in blocks, the blocks being oriented, in the plane of the panel, identically for all the sensors, the blocks being distributed in the length of the panel.

According to one embodiment of the system according to the invention, the mobile platform comprises one or more side walls reflecting the electromagnetic waves and each panel of the platform is inclined about an axis that is substantially orthogonal to the plane of said panel, at an angle α formed with the vertical of between 20° and 70°.

The angle of inclination is, preferably, chosen so that at least one period of the interference signal can be represented on a substantially vertical axis and that advantageously, at least a quarter of a period of the interference signal can be represented on a substantially horizontal axis. This configuration makes it possible, with a minimum of antennas, to deal with the problems due to the multiple paths of the waves deriving from reflections both on the decking surface but also on the side walls.

Each panel can be inclined about an axis that is substantially orthogonal to the decking surface, the lighting beams of said panels intersecting in azimuth above the decking surface.

Crossing the lighting beams makes it possible to obtain a greater lighting coverage while maintaining the decking point—the place where it is desired that the aircraft should land on the decking surface—with strong misalignments. For example, the panels that form the sensors can be turned so that their main lobes overlap optimally on the decking point.

According to one embodiment of the system according to the invention, a local oscillator is linked to the sensors to produce a radio-interferometer that can be applied to the signals transmitted by the aircraft. Producing this interferometer makes it possible notably to increase the accuracy of the aircraft position measurement. It is also possible, to make the azimuth position measurement redundant in the final decking phase, to use an infrared camera to detect the aircraft.

According to another embodiment, each sensor is an optical camera. Preferably, each of the cameras is mobile, so as to cover a sufficiently wide azimuth angle.

The system according to the invention can comprise a reference beacon joined to the platform and oriented to transmit signals towards the sensors. This reference beacon makes it possible notably to calibrate the sensors, and avoid thermal drifts. It also makes it possible to construct a reference direction relative to the platform. In the case where the sensors are optical camera receivers, the reference beacon may be a simple light source.

According to one embodiment of the system according to the invention, the aircraft is unmanned, the aircraft being able to be automatically guided remotely, for example from the platform. The system according to the invention applies more particularly to rotary wing aircraft such as, for example, helicopters, the latter type of craft requiring great accuracy in the final approach and decking.

Another subject of the invention is a method for assisting in the decking of an aircraft on a mobile platform comprising a decking surface, the method comprising at least the following steps:

transmitting, from the aircraft, signals;
receiving, on at least two passive sensors joined to the platform, the signals transmitted by the aircraft and determining the position of the aircraft from these received signals;
expressing the coordinates of the position of the aircraft in a frame of reference corresponding to an immobile platform,
predicting the movements of the platform;
formulating flight commands to orient the aircraft on its decking trajectory by using the coordinates of the aircraft expressed previously and the predicted movements of the platform.

According to one implementation of the method according to the invention, for which the decking surface reflects the electromagnetic waves, in which each sensor is a panel inclined about an axis that is substantially orthogonal to the plane of said panel, by an angle α formed with the vertical of between 20° and 70°, a panel on which several antenna receivers are distributed in the two dimensions of the panel, the method comprises a step for eliminating the multiple paths in elevation and in azimuth by performing a spatial sampling of the amplitude of the interference signal received by at least one sensor in the elevation axis and by performing a spatial sampling of the amplitude of the interference signal received by at least one sensor in the azimuth axis.

According to one implementation of the method according to the invention, the platform transmits data by radiofrequency channel to the aircraft by virtue of a transmitter, the power level for transmission by said transmitter being adjusted according to the distance measured between said platform and the aircraft, the transmission power being reduced when the aircraft is approaching the platform. This method makes it possible to improve the electromagnetic discretion of the platform; it also makes it possible to ensure that the aircraft can return to the platform in the event of loss of the main link and/or the satellite navigation system. The power of the onboard beacon can be dimensioned to allow for a detection of the aircraft so it can be guided to the boat. The beacon is controlled in power to be as discrete as possible and to avoid saturation in the nearby area.

According to one implementation of the method according to the invention, for each sensor, the position of the aircraft is determined from the signals received on said sensor, then the position of the aircraft is determined by triangulation based on the measurements obtained from at least two sensors, and these independently determined positions are combined to increase the reliability of the locating of said aircraft.

According to one implementation of the method according to the invention, the signal transmitted from the aircraft and received by the sensors of the platform is a single-frequency signal transmitted in band X or a signal comprising a frequency-based comb of rays. The use of a signal comprising a comb of rays makes it possible to obtain frequency agility and also makes it possible to be freed from the multiple paths.

Moreover, the step for formulating flight commands for orienting the aircraft on its decking trajectory can also take into account navigation data obtained directly from the aircraft instruments, such navigation data being, for example, obtained from a GPS terminal, from an inertial unit, from accelerometers, or from a magnetic compass.

BRIEF DESCRIPTION OF THE DRAWINGS

Other characteristics will become apparent from reading the following detailed description, given as a nonlimiting example, and in light of the appended drawings which represent.

DETAILED DESCRIPTION OF THE INVENTION

In the interests of clarity, the same references in different figures designate the same elements.

Figure 1A:
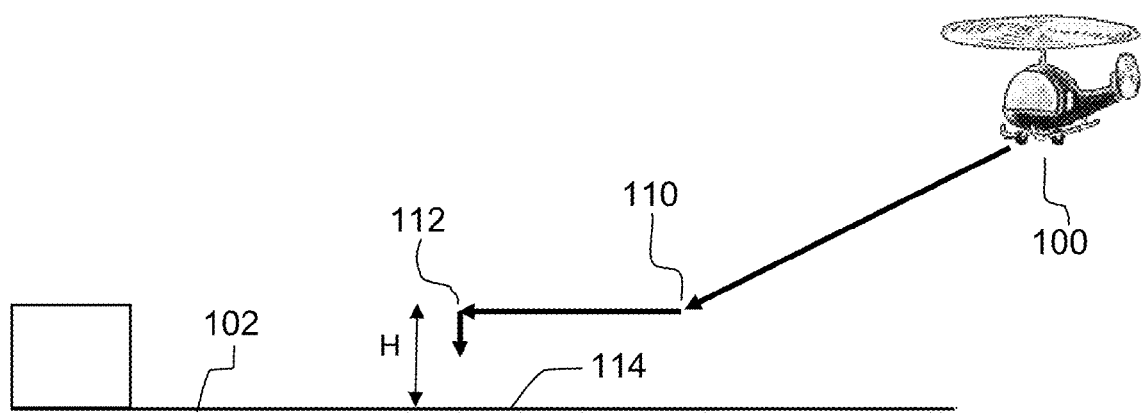
FIG. 1a, an exemplary strategy for decking an independent rotary wing aircraft on a platform.
Figure 1B:
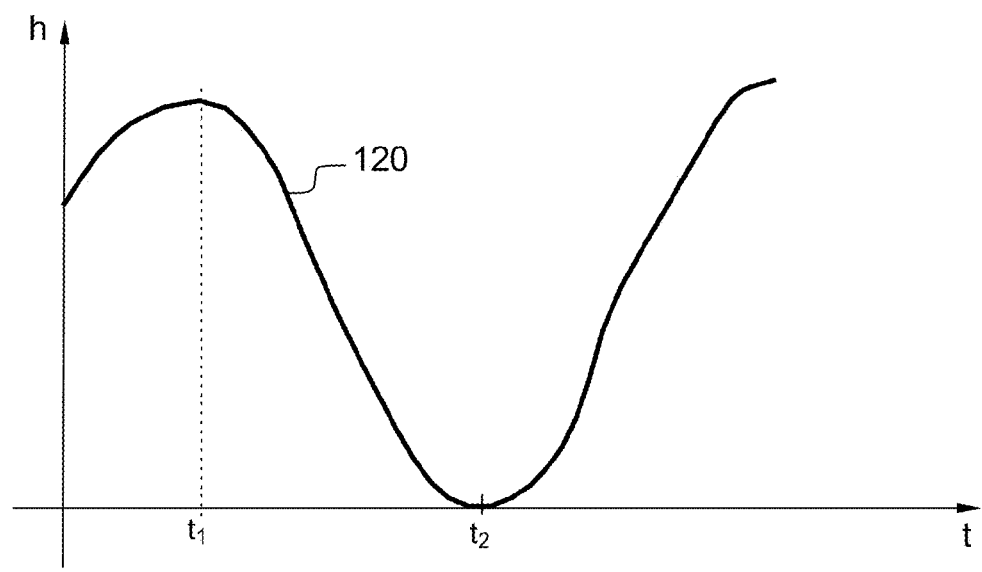
FIG. 1b, a generic curve representing the variation as a function of time of the position height-wise of the platform, with movement referred to as heave.

FIG. 1a illustrates an exemplary strategy for decking an independent rotary wing aircraft 100 on a platform. In the interests of simplicity, the platform 102 is, in the example, only subject to heave movements, in other words translation movements on a vertical axis. The amplitude of these movements is represented in FIG. 1b. The rotary wing aircraft 100, which, for example, is an unmanned helicopter, is automatically guided from the platform by virtue of the system according to the invention, detailed in the following figures.

Initially, the rotary wing aircraft 100 is guided in a downward slope, at an angle α for example equal to 4° with the horizontal, to a point 110 situated at a height H above the maximum height reached by the platform 102. In a second stage, the rotary wing aircraft 100 is guided horizontally to a point 112 situated directly above the planned decking point 114. Then, in a third stage, the rotary wing aircraft 100 is commanded to contact the decking point 114 by a downward vertical movement. The aircraft 100 must therefore be commanded at the right moment to avoid violently striking the platform 102.

FIG. 1b shows a generic curve representing the variation as a function of time of the position height-wise of the platform 102. The curve reflects a substantially sinusoidal variation of the height h of the platform 102 as a function of time t. The moment t1 at which the rotary wing aircraft 100 of FIG. 1a is commanded to descend to the decking point 114 preferably occurs when the height h of the platform 102 is at its maximum. The aircraft 100 must then move sufficiently rapidly to contact the decking point 114 at an instant t2, preferably when the platform 102 is at its lowest point, its heave speed being roughly zero at that instant t2. When the aircraft 100 lands during the downward phase of the heave of the platform 102, the impact is dampened; when the rotary wing aircraft 100 lands at the instant t2, it can be likened to the case of a landing. Not only the position of the platform 102, but also the speed of movement of the platform 102, is therefore anticipated, so as to render the decking conditions as favourable as possible for the aircraft 100. In the absence of such anticipation, the landing gear of the aircraft could suffer damage by violently striking the platform 102. Preferably, the refresh frequency for the information transmitted to the aircraft 100 is of the order of at least ten times the frequency of the movements undergone by the mobile platform 102, in order to correctly anticipate the right decking moment and to be able to frequently readjust the trajectory of the aircraft 100 until the decking thereof.

The system according to the invention makes it possible notably to determine, from the platform 102, the position of the aircraft—in the event, the position of the helicopter 100—and transmit to this aircraft guidance commands to enable it to land in safety. To calculate the position of the aircraft 100, the system according to the invention determines the distance between the platform 102 and the aircraft 100.

Figure 2:
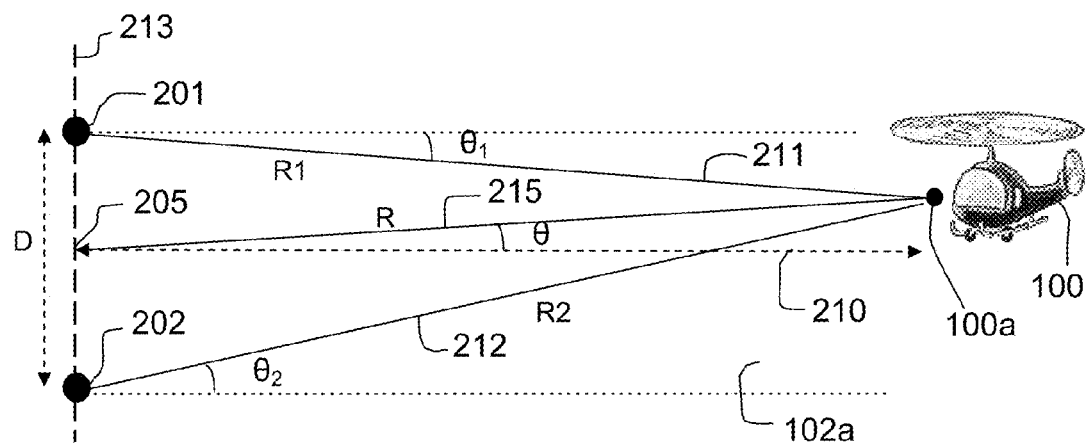
FIG. 2, an illustration of a method for measuring the distance between the sensors and the aircraft implemented by the system according to the invention.

FIG. 2 illustrates a method for measuring the distance separating the sensors and the aircraft implemented by the system according to the invention. The decking surface 102a of the platform 102 is represented in plan view. A number of passive sensors 201, 202 (in the example, two sensors 201, 202) are installed on one side of the decking surface 102a. Each of these sensors 201, 202 can independently perform a locating of the aircraft 100 by a method already described in the international application WO2007/063126. These independent locating operations can be combined in the context of the system according to the invention in order to reinforce the reliability of the locating measurements. Moreover, the position of the aircraft can be determined by triangulation, as described hereinbelow.

According to a preferred embodiment represented in the subsequent figures, the sensors comprise antenna receivers able to detect radiofrequency electromagnetic signals. According to another embodiment, the sensors are able to detect optical signals; these are, for example, optical cameras.

Advantageously, the axis 213 linking the two sensors 201, 202 is orthogonal to the approach axis of the aircraft 100 in the horizontal plane. In the example, this axis 213 is orthogonal to the axis 210 of the runway 102 that forms the decking surface 102a. The axis 213 formed by the two sensors 201, 202 and the axis 210 of the runway 102 intersect at an origin point 205. The two sensors 201, 202 are separated by a distance D. The aperture in azimuth and in elevation of these sensors 201, 202 is chosen to take account of the potential flight dispersions of the aircraft. It also makes it possible to detect the aircraft within a wide window from the platform 102. In elevation, this makes it possible to overcome the height variations associated with heave and bursts of wind. The sensors 201, 202 can be coherent, that is to say use one and the same local oscillator to process the received signals.

The aircraft 100 is provided with a transmitter 100a broadcasting signals towards the sensors 201, 202. Advantageously, the signals transmitted by the transmitter 100a are a simple continuous single-frequency signal, often designated by the acronym CW (Continuous Wave). This CW signal can, for example, be transmitted in band X in order, notably, to be highly insensitive to the climatic conditions.

The system according to the invention makes it possible to determine the distance R separating the origin point 205 of the aircraft 100 and to determine the angle θ formed in the horizontal plane between the axis 215 linking the origin point 205 to the aircraft 100 and the axis of the runway 210. The angle formed between the orthogonal to the axis 213 of the sensors 201, 202 passing through the first sensor 202 and the axis 211 linking the first sensor 201 to the aircraft 100 is denoted $\theta_1$. The angle formed between the orthogonal to the axis 213 of the sensors 201, 202 passing through the second sensor 202 and the axis 212 linking the second sensor 202 to the aircraft 100 is denoted $\theta_2$. The first sensor 201 is able to measure the angle $\theta_1$, and the second sensor 201 is able to measure the angle $\theta_2$.

Firstly, the angle θ is determined by the following relation $\theta=(\theta_2-\theta_1)/2$. Secondly, the distance R is determined as follows:

$$R = \frac{D}{|\tan\theta_1| + |\tan\theta_2|}.$$

When the aircraft 100 moves at low altitude, given the small values of the angles $\theta_1$ and $\theta_2$, R can be estimated by the following approximation:

$$R \approx \frac{D}{|\theta_1| + |\theta_2|}.$$

Figure 3:
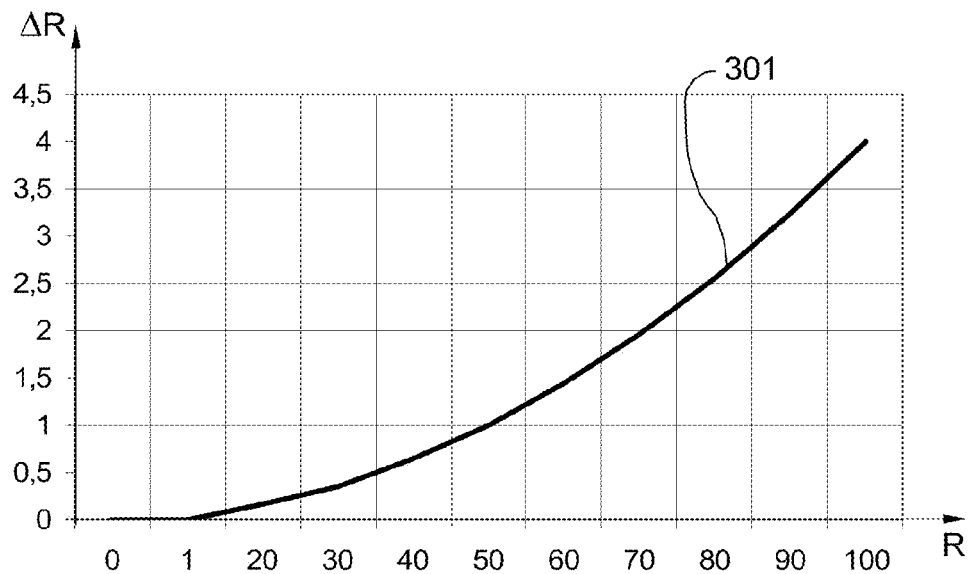
FIG. 3, a curve representing an example of the error made on the distance measurement according to the distance of the aircraft given a sensor separation of 10 meters and an angular error of 2 mrad.

Moreover, the angular measurement error Δθ is equal to half of the sum of the angular measurement errors $\Delta\theta_1, \Delta\theta_2$ on each of the angles $\theta_1$ and $\theta_2$. In other words, $\Delta\theta=(|\Delta\theta_1|+|\Delta\theta_2|)/2$. Furthermore, the distance measurement error ΔR is expressed as follows: $\Delta R=(2R^2/D)\cdot\Delta\theta$; FIG. 3 represents, via a curve 301, an example of this error ΔR made on the distance measurement according to the distance R of the aircraft for D=10 meters and Δθ=2 mrad. The accuracy obtained on the distance measurement R therefore increases as the aircraft 100 approaches the decking point.

The detection of the aircraft 100, when the latter is still far away from the decking point 114, for example a few dozen km away, makes it possible to preposition the aircraft 100 on the decking trajectory at long distance. Now, the measurement error ΔR being quadratic according to the measured distance R, alternative methods for determining the distance of the aircraft 100 can be applied when the distance R is great at the point when the measurement error ΔR obtained by the above-mentioned method becomes unacceptable.

Figure 4A:
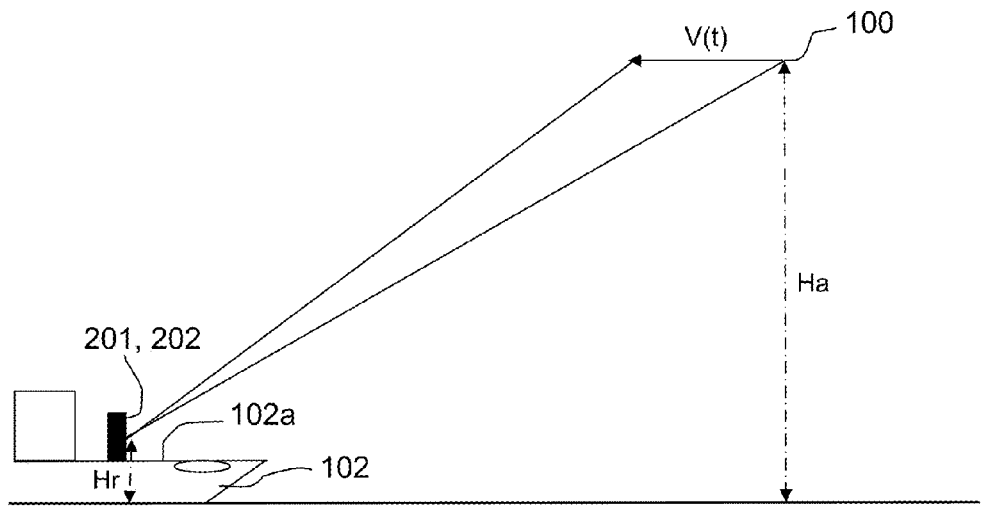
FIGS. 4a and 4b, examples of techniques for measuring the distance between the sensors and the aircraft.

For example, it is possible to carry out a distance measurement by cooperative approach. This technique, illustrated in FIG. 4a, requires knowing the elevation of the aircraft 100 or its speed of approach before the latter begins its descent slope. These parameters can, for example, be determined directly by virtue of the instruments onboard the aircraft 100, then transmitted to the sensors 201, 202 by the transmitter 100a onboard the aircraft 100. Knowing the altitude Hr at which the sensors 201, 202 are situated, the altitude Ha of the aircraft 100 or its approach speed V(t) towards said sensors 201, 202, it is possible, by a simple calculation known to those skilled in the art, to deduce the distance R separating the aircraft 100 from the sensors 201, 202.

The distance between the sensors 201, 202 and the aircraft 100 can also be obtained by virtue of a transponder onboard the aircraft 100, which transponder, by transmitting a response message immediately upon receipt of an interrogation message from the platform 102, is used as a secondary radar.

Figure 4B:
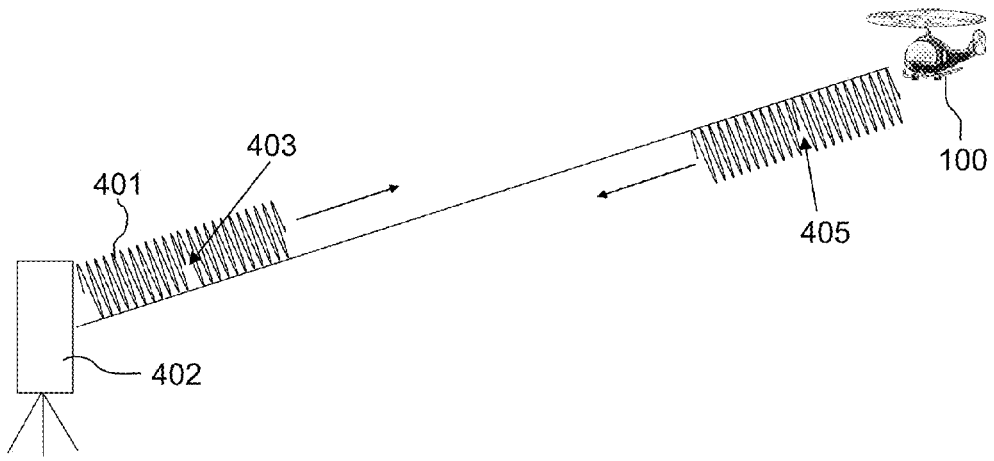

According to an alternative distance measurement method illustrated in FIG. 4b, a phase hop-based synchronization can also be employed. A signal 401 of continuous pseudo-frequency, also used to transmit information, for example position information, can be produced by a transmitter 402 installed on the platform 102. This signal, of low power and comprising a phase hop 403, is received by a beacon 100a onboard the aircraft 100. Upon the receipt of a phase hop by the aircraft 100, after an appropriate latency time, the response of the aircraft 100 is given, for example, by the transmission of a phase hop 405. The benefit of such a principle lies in the robustness of the phase hop by comparison with rise times that cause multiple echoes.

According to one embodiment of the system according to the invention, the transmitter 100a onboard the aircraft 100 is a multifunction beacon notably comprising receive channels making it possible to communicate with the platform 102, this beacon also being able to handle the role of transponder. Advantageously, the multifunction beacon can also comprise means for producing altitude measurements, said beacon fulfilling the radio-altimeter function and cyclically transmitting the measured altitude to the platform 102 via transmissions to the sensors 201, 202. This functionality makes it possible, by combination with the measurements made from the sensors, to obtain information redundancy for the altitude value of the aircraft 100. It also makes it possible to obtain an altitude value when the aircraft is above the platform 102.

According to one embodiment of the system according to the invention, a number of transmitting beacons are installed on the aircraft 100. The distance measurement between these beacons makes it possible notably to determine and transmit to the platform 102 the relative heading of the aircraft 100 in relation to the heading of the platform 102 and the roll of the aircraft 100. In practice, knowing the distance between the platform 102 and a first onboard beacon, the distance between the platform 102 and a second onboard beacon, and the separation between these two beacons, it is possible to deduce therefrom the heading of the aircraft. Furthermore, by assigning a different transmission frequency for each beacon, it is possible to fight effectively against the multiple echoes, notably in azimuth. Moreover, the use of a number of beacons reinforces the reliability of the system by redundancy effect.

Another benefit of the presence of one or more transmitting beacons in the aircraft is that it is then possible to liken the aircraft to a one-off target, avoiding the fluctuations of the bright points of the aircraft 100 according to its presentation with respect to the sensors 201, 202.

According to an embodiment of the system according to the invention, the multifunction beacon onboard the aircraft comprises one or more accelerometers making it possible to control its trim.

Figure 5A:
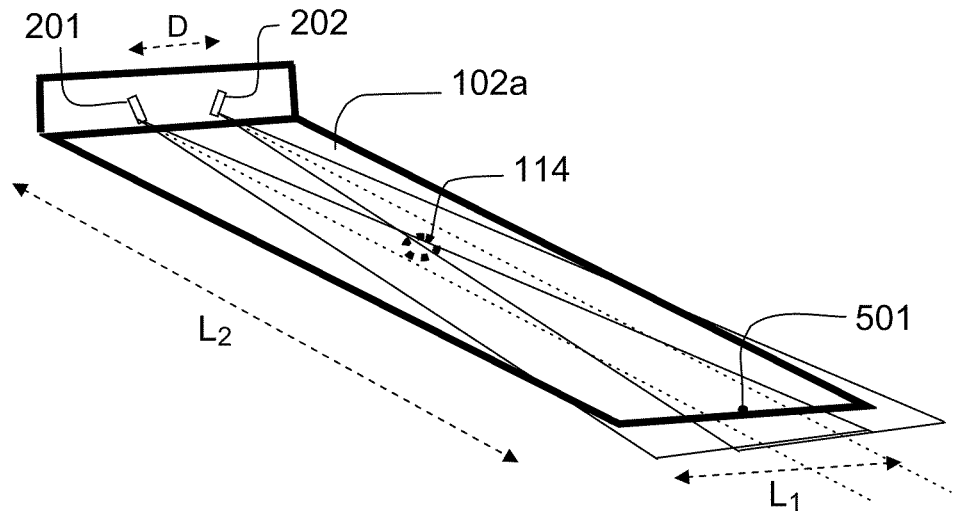
FIG. 5a, an exemplary implementation of the system according to the invention on a landing spot or runway.
Figure 5B:
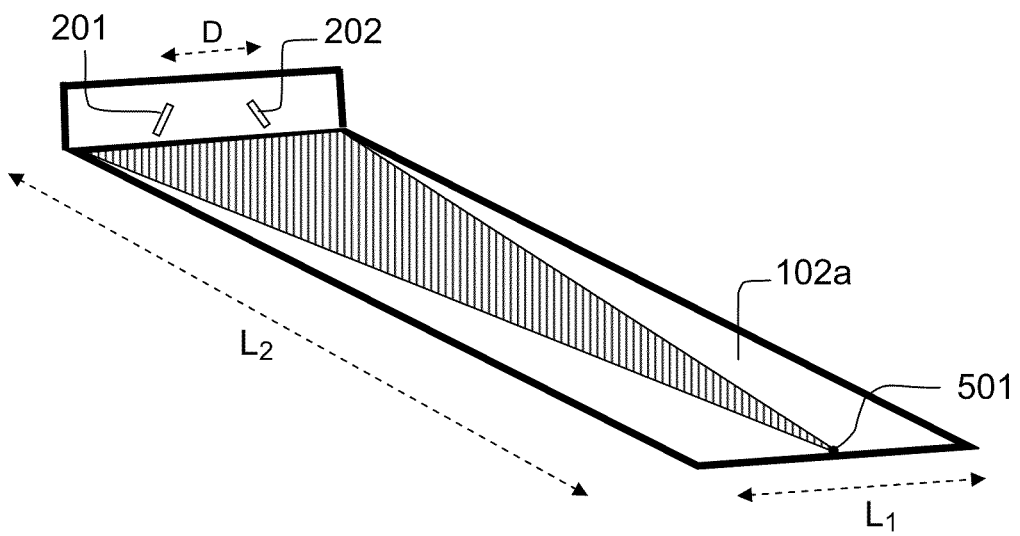
FIG. 5b, a representation of the coverage of the beam transmitted by the reference beacon joined to the platform.

FIG. 5a illustrates an exemplary implementation of the system according to the invention on a landing spot or runway. In the example, the sensors 201, 202 are antenna panels as detailed in FIGS. 7a and 7b. The decking surface 102a is, for example, a runway of width L1 equal to 20 m and of length L2 equal to 50 m. These panels 201, 202 are, for example, placed at the end of the decking surface 102a and in a plane that is substantially orthogonal to this surface 102a, so as to radiate towards it 102a. A reference beacon 501 is placed, for example, at the other end of the decking surface 102a. This reference beacon 501 makes it possible to indicate a constant direction to the sensors 201, 202, to gauge and to calibrate said sensors 201, 202, and to avoid the thermal drifts by re-gauging the sensors with the trend of the sunlight and/or temperature conditions. The reference beacon 501 transmits a signal towards the sensors 201, 202, as illustrated in FIG. 5b, which figure represents, shaded, the coverage of the beam transmitted by the reference beacon 501. The signal transmitted by the reference beacon 501 has a different frequency from that of the signal transmitted by the transmitter, for example the multifunction beacon 100a, onboard the aircraft 100. According to another embodiment in which the sensors 201, 202 are optical sensors, the reference beacon 501 is a diode or a laser used for the calibration of said sensors 201, 202, such a beacon 501 making it possible to realign the system in relative mode relative to the decking surface 102a and to give a reference (a common "zero") to the sensors 201, 202.

Figure 6:
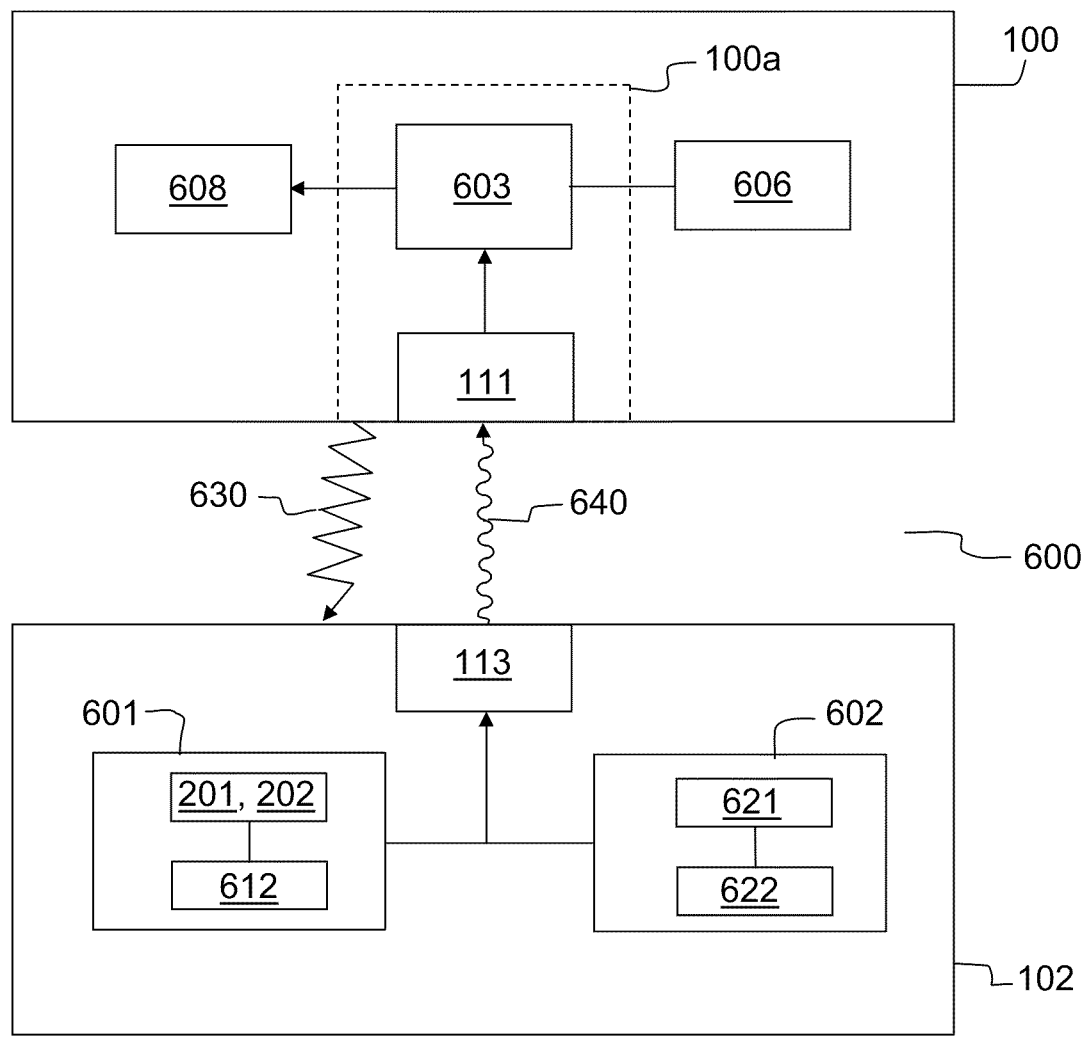
FIG. 6, an exemplary architecture of the system according to the invention.

FIG. 6 shows an exemplary architecture of the system according to the invention. The system 600 notably comprises means 601 of locating the aircraft 100, means 602 of predicting the movements of the platform 102 and means 603 of determining the flight commands to be executed by the aircraft 100 to perform the decking operation.

The means 601 of locating the aircraft 100 make it possible, from the measurements performed by the sensors 201, 202, to calculate the coordinates of the position of the aircraft 100, for example using the method shown in FIG. 2. According to the embodiment shown, these locating means 601 comprise the sensors 201, 202 and processing means 612 able to transform the coordinates of the position of the aircraft 100 obtained from the measurements of the sensors 201, 202 to express them in a frame of reference corresponding to an immobile platform 102, which, for example, for a ship, corresponds to a "flat sea" frame of reference.

The prediction means 602 comprise, for example, an inertial unit 621 measuring the movements of the platform 102. This inertial unit 621 can be specifically dedicated to the system according to the invention or indeed be the inertial unit specific to the platform 102, for example that of the ship, in the case where the platform 102 is a ship. The prediction means 602 also comprise processing means 622 able to extrapolate the movements of the platform 102, so as to anticipate the manoeuvres required of the aircraft 100 in order to successfully complete the decking operation, as illustrated in FIG. 1a.

The means 603 of determining the flight commands, from the "flat sea" coordinates of the aircraft 100 and from the measurements predicting the movements of the platform 102, determine the manoeuvres to be executed by the aircraft 100 to reach the decking position, in other words, formulate commands to make the aircraft 100 follow the planned decking trajectory, these commands being transmitted to the guidance means 608 of the aircraft 100. The measurements in the flat sea frame of reference make it possible to have a tracking of the aircraft 100 specific to its real movements and not with the conjugate movements of the platform 102 and of the aircraft 100. This makes it possible to compare positions and speeds in the same frame of reference. Even if the decking is done in relative mode, by cancelling the relative speed of the aircraft 100 and of the platform 102, for reasons of simplicity and so as not to modify the automatic pilot of the aircraft 100, it is easier to correct the absolute position known to the aircraft 100 and adjust this position to "flat sea" coordinates.

According to the embodiment shown in FIG. 6, the means 603 of determining flight commands are incorporated in the aircraft 100, for example in a multifunction beacon 100a. The navigation measurements of the aircraft 100, such as the speed and attitude, are, for example, supplied by an onboard inertial unit 606 and/or a GPS terminal present in the aircraft 100. Other measurement sources, such as a baro-altimeter, a magnetic compass or accelerometers, can feed the means 603 of determining flight commands in order to increase the redundancy of the information manipulated by said means 603 and thus carry out integrity checks on the measurements originating from the other sources. The position measurements obtained from the locating means 601 of the aircraft 100 and the measurements predicting the movements of the platform 102 can be transmitted to the aircraft 100 via a radiofrequency link 640. The aircraft comprises radiocommunication means 111, which can be included in a multifunction beacon 100a provided with reception means if the aircraft 100 has such a beacon onboard or else constitute an external radiocommunication link. In the example of FIG. 6, a multifunction beacon 100a comprises reception means 111 and also transmits the signals 630 received by the sensors 201, 202 and that are used by the locating means 601 to determine the position of the aircraft 100.

The platform 102 comprises a low-power transmitter 113 making it possible to communicate with the aircraft by transmitting the data determined by the means 601 of locating the aircraft 100 and the means 602 of predicting the movements of the platform 102.

According to another embodiment, the processing means 603 are installed on the platform 102. The low-power transmitter 113 present on the platform 102 then transmits, to the aircraft 100, the flight commands calculated on the platform 102, whereas the navigation measurements of the aircraft—for example, the speed and attitude—are transmitted to the platform 102 via the multifunction beacon 100a or an external radiocommunication link.

The system according to the invention does not affect the discretion of the platform 102, because, unlike radars that require high transmission power to receive a usable echo, the powers used in the context of the invention are those used for short and middle-distance radiocommunications. Furthermore, the power of the transmission to the aircraft can be adjusted according to the distance separating the platform 102 from the aircraft 100, that is to say reduced as the aircraft 100 approaches its decking point 114. Moreover, it is possible for this radiocommunication link to choose a frequency range that is not disturbing to the electromagnetic environment.

The architecture of FIG. 6 also shows the benefit of a certain flexibility since the measurements obtained from the sensors can be replaced by other types of measurements, for example GPS measurements. In order to avoid having to make costly modifications to the aircraft 100, the measurements obtained from the locating means 601 are, preferably, transmitted in the same format as the GPS data conventionally transmitted to the aircraft 100. In practice, since the aircraft are generally designed to operate in absolute mode, with GPSs, the transmission of the data in the same format avoids recertifying the guidance means 608 of the aircraft—the automatic pilot—in relative mode, assuming that this mode is not already implemented.

Figure 7A:
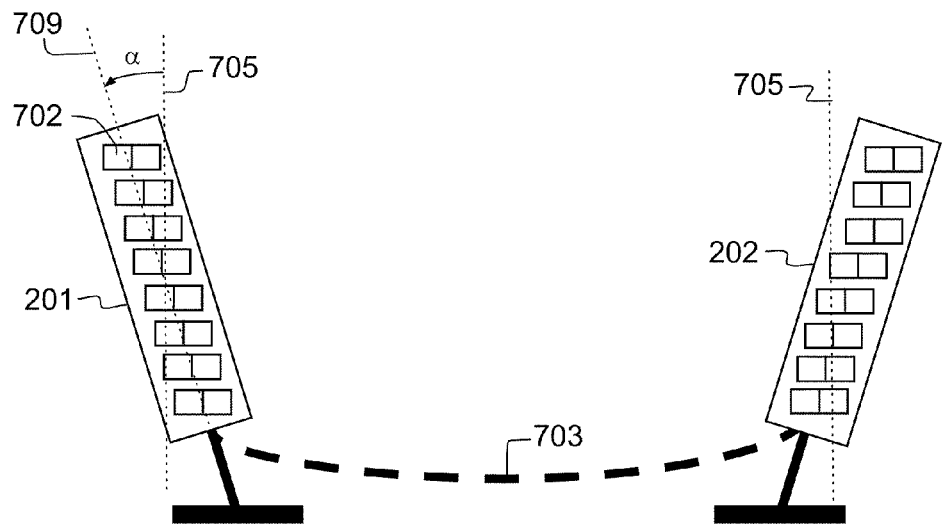
FIG. 7a, a first exemplary configuration of the sensors making it possible to deal with the problem of the signal reflections on the side walls to the decking surface.

FIG. 7a shows a first exemplary configuration of the sensors making it possible to deal with the problem of the reflections of signals on the side walls to the decking surface.

To avoid the problems associated with the reflections of signals on the decking surface 102a, the sensors 201, 202 are, for example, panels comprising pairs of blocks 702 of aligned antenna receivers, such as the panels proposed in the international patent application referenced under the number WO2008/113750. The panels can be linked by a cable 703. Each block 702 of receivers comprises, for example, four planar receiving antennas 706. Each sensor 201, 202 can be fixed so that the alignment of the pairs of antennas is combined with a vertical axis 705. Thus, it is possible to perform a spatial sampling on the elevation axis of the amplitude of the interference signal, which is made up of the sum of the signal received directly by the sensor 201, 202 and of the signal reflected on the decking surface 102a then received by the sensor 201, 202. If the signal transmitted by the aircraft is a signal of CW type, then it is sufficient for the pairs of blocks 702 to be sufficiently tight in the vertical axis 705 to observe the Shannon condition and reconstitute an interference signal in the form of a sinusoid.

However, in the presence of side walls in proximity to the decking surface 102a, the sensors 201, 202 are advantageously tilted so that the pairs of blocks 702 of antennas are arranged along an axis 709 forming an angle α of, for example, between 20° and 70° with the vertical axis 705. Preferably, the blocks 702 are oriented in the same direction for the two sensors 201, 202. In the example of FIG. 7a, the blocks 702 are placed on an axis 707 forming an angle β with the axis 709 of orientation of the panel. The inclinations of the sensors may be unequal and in the same direction or the opposite direction (for example, −45° for one sensor and 45° for the other). Inclining each sensor 201, 202 about a horizontal axis that is orthogonal to the plane of said sensor makes it possible to also perform a spatial sampling on the azimuth axis of the amplitude of the interference signal, which is made up of the sum of the signal received directly by the sensor 201, 202 and of the signal reflected on the side bulkhead(s) then received by the sensor 201, 202.

Thus, by performing a spatial sampling in two dimensions for each sensor 201, 202, it is possible to identify the place on each sensor 201, 202 corresponding to the interference signal of maximum amplitude and reapply the formulae demonstrated in the international patent application WO2007/131923. The amplitudes measured on the antennas are a product of a sine function described in this patent application. The inclined positioning of the sensors, and the spatial sampling in two dimensions of the interference signal makes it possible, by using a minimum of antennas, to be freed of the multiple paths both in elevation and in azimuth.

Figure 7B:
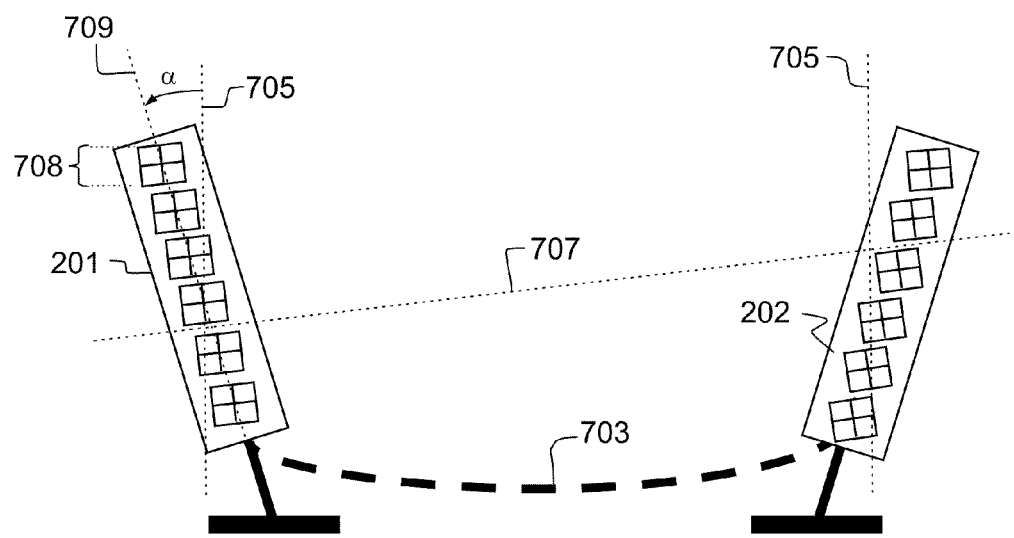
FIG. 7b, a second exemplary configuration of the sensors making it possible to deal with the problem of the signal reflections on the side walls to the decking surface.

FIG. 7b shows a second exemplary configuration of the sensors making it possible to deal with the problem of the signal reflections on the side walls to the decking surface. According to this embodiment, the blocks 702 of antennas are assembled in groups 708 of four blocks, each group 708 comprising two pairs of blocks 702 aligned vertically, the groups 708 being arranged along the axis formed by the angle α of inclination of the panel of the sensor 201, 202.

Figure 8A:
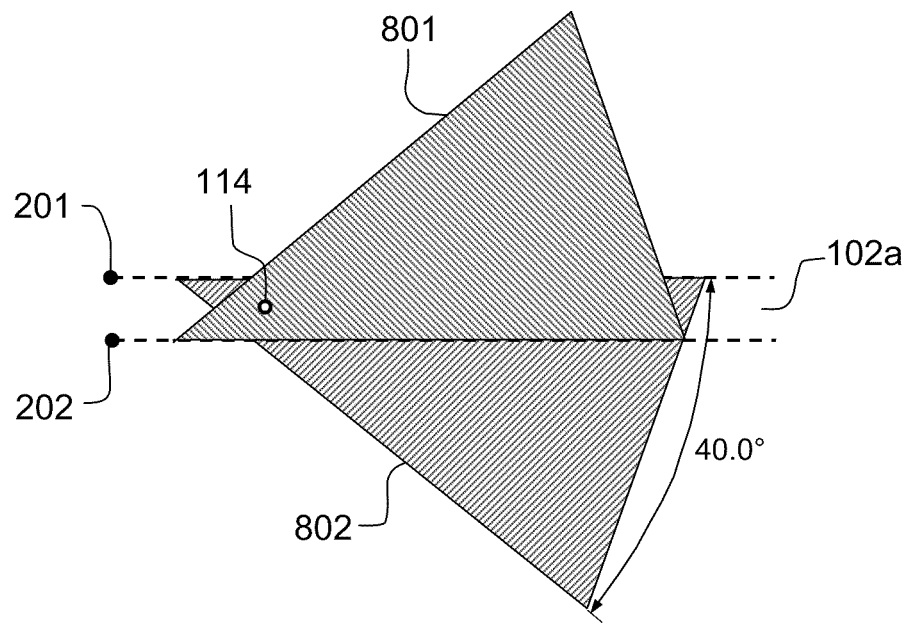
FIG. 8a, an exemplary positioning of the sensors favouring wide coverage of the space, FIG. 8b, an exemplary positioning of the sensors making it possible to maximize the measurable distance to the aircraft.

FIG. 8a shows an exemplary positioning of the sensors that favours a wide coverage of the space. According to the embodiment of FIG. 8a, the lighting beams 801, 802 of the two sensors 201, 202 intersect in the azimuth axis, which makes it possible to obtain a wide lighting coverage in azimuth while maintaining the decking point 114 or the decking grating at which the aircraft will be aimed—that is to say the place where it is desired that the aircraft should land on the decking surface 102a—with strong misalignments of the sensors 201, 202. For example, the sensors 201, 202 may be turned about a vertical axis so that the left main lobe of the beam obtained from the righthand sensor 201 and the right main lobe of the beam obtained from the lefthand sensor 202 maximally illuminate the decking point 114. In the example, the lighting angles of each of the beams are, for example, equal to 40°.

Figure 8B:
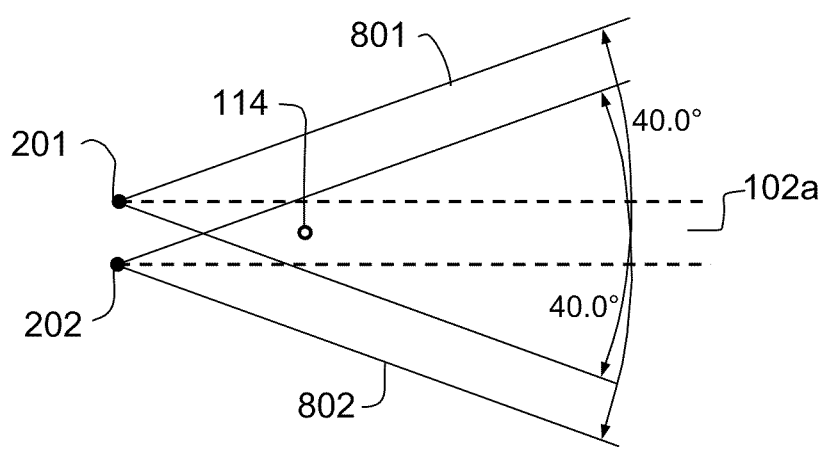

FIG. 8b shows an exemplary positioning of the sensors making it possible to maximize the measurable distance to the aircraft. According to the embodiment of FIG. 8b, the lighting beams 801, 802 of the two sensors 201, 202 are substantially parallel in the azimuth axis. This positioning allows for a detection of the aircraft at a greater distance than with the positioning of FIG. 8a.

According to an embodiment of the system according to the invention, a local oscillator is shared between the sensors 201, 202 for the purposes of forming an interferometer. This use makes it possible to increase the accuracy of the determination of the position of the aircraft on an ambiguous but precise basis. The duly constructed interferometer makes it possible to measure the distance by measuring the difference between the times of arrival of the signals on each of the sensors 201, 202. For a signal transmitted by the aircraft in band X, this arrival time difference makes it possible to achieve angular accuracies ten times better than those obtained with amplitude goniometry.

Furthermore, it is possible to increase the redundancy of the measurements by taking into account, in succession, for each antenna 706 of a sensor 201, 202, only certain radiating elements of this antenna, for example three elements out of four available, then check the measurements obtained for each triplet.

When the sensors 201, 202 are not parallel—for example, if they are inclined in opposite directions—then the dimension of the interferometric base in azimuth varies according to the elevation. It is thus possible to correlate the signals from these different interferometric bases and eliminate the erroneous signals obtained from multiple paths originating from lateral reflections. The angular values gathered in this way make it possible to refine the measurement and increase the accuracy. A gauging of the interferometry base, notably by virtue of the reference beacon 501 (FIG. 5a), allows for a relative positioning measurement relative to the platform 102.

Although the invention is mainly targeted at the decking of aircraft, it can also be applied to other flight phases and notably the take-off phases. Moreover, the system can also be used in the case of a landing, notably when the landing runway is provided with one or more side walls, the latter provoking multiple wave paths in the azimuth axis.

The benefits procured by the invention are many. The use of the method according to the invention makes it possible to retain an electromagnetic discretion onboard the decking platform. It, for example, enables an aircraft to deck, even in seas that are subject, for example, to a wind of force 5 on the Beaufort scale, and do so automatically, that is to say without human intervention to assist the aircraft in the decking procedure.

The method according to the invention can be implemented with minimal impact on the functional architecture of the aircraft, by virtue of the short latency time obtained, that is to say the time that elapses from the transmission of a signal from the transmitter 100a onboard the aircraft to the transmission to the aircraft of the flight commands calculated on the basis of the measurements of this signal. This latency time is less than 100 ms. The refresh rate for the measurements (or repetition frequency) makes it possible to minimize the speed calculation errors and filter the information by taking into account movements of the decking platform.

Implementing the method according to the invention notably makes it possible to optimize the volume and the weight of the onboard electronics and minimize the installation constraints in terms of electromagnetic discretion on the decking platform, the number of antennas on the aircraft and on the decking platform, number of interfaces, synchronization of the signals, management of the frequencies, integrity of the information received.

Moreover, by virtue of its flexible architecture, the system according to the invention is portable and can be easily certified. In practice, the critical elements of said system are not intimately linked to the aircraft and the data link connecting the platform to the aircraft is not subject to great dependability requirements, these requirements usually involving digital coding constraints that are relatively expensive to implement and that can adversely affect performance.

Furthermore, the system according to the invention is suitable for use subject to random climatic events; notably, the sensors used can operate even in bad weather.

Furthermore, implementing the system is simple, straightforward and fast.

Finally, the system according to the invention consumes little energy, the beacons onboard the aircraft having very low transmission powers, of the order of a few milliwatts.

What is claimed is:

1. A system for assisting in decking of an aircraft on a mobile platform, said mobile platform comprising a decking surface, said aircraft comprising a signal transmitter, and said decking surface of the mobile platform reflecting electromagnetic waves of signals transmitted by the signal transmitter of the aircraft, the system comprising:
means for determining flight commands to be executed by the aircraft, said means being configured to determine flight commands that dampen an impact of the aircraft on said mobile platform during the decking of the aircraft, said commands being a function of a position of the aircraft determined by locating means and extrapolation of movements of the mobile platform determined by prediction means, the locating means comprising at least two passive sensors spaced apart and fixed in proximity to the decking surface, the at least two passive sensors being configured to receive signals transmitted by the signal transmitter of the aircraft, each of the at least two passive sensors being a panel fixed in a plane orthogonal to the decking surface, each panel comprising antenna receivers distributed in the two dimensions of the plane of each panel, each panel being inclined about an axis orthogonal to the decking surface, and lighting beams of said panels intersecting at an azimuth angle above the decking surface.

2. The system according to claim 1, wherein the antenna receivers of each panel are planar antennas assembled in blocks, the blocks being oriented, in the plane of each panel, identically for all of the sensors, and the blocks being distributed along the length of each panel.

3. The system according to claim 1, wherein the mobile platform further comprises one or more side walls reflecting the electromagnetic waves, and wherein each panel is inclined about an axis orthogonal to the plane of said panel, at an angle α formed with the vertical of between 20° and 70°.

4. The system according to claim 1, further comprising a local oscillator linked to the at least two passive sensors to produce a radio-interferometer that is configured to be applied to the signals transmitted by the signal transmitter of the aircraft.

5. The system according to claim 1, wherein each of the at least two passive sensors is an optical camera.

6. The system according to claim 1, further comprising a reference beacon joined to the mobile platform, the reference beacon oriented to transmit signals towards the at least two passive sensors.

7. The system according to claim 1, wherein the aircraft is unmanned and able to be automatically guided remotely.

8. A method for assisting in decking of an aircraft on a mobile platform, at least two passive sensors being joined to said mobile platform, said mobile platform comprising a decking surface, said decking surface of the mobile platform reflecting electromagnetic waves of signals transmitted by a signal transmitter of the aircraft, each of the at least two passive sensors being a panel comprising antenna receivers distributed in the two dimensions of the plane of each panel, and each panel being inclined about an axis orthogonal to a plane of each panel, the method comprising:
transmitting signals from the aircraft;
receiving, by at least two passive sensors joined to the platform, the signals transmitted by the aircraft;
determining a position of the aircraft based on the received signals;
expressing the coordinates of the position of the aircraft relative to a frame of reference corresponding to an immobile platform;
predicting movements of the mobile platform;
formulating flight commands to orient the aircraft on its decking trajectory using the coordinates of the position of the aircraft and the predicted movements of the mobile platform to dampen an impact of the aircraft on the mobile platform during the decking of the aircraft; and
eliminating multiple paths in elevation and in azimuth by performing a spatial sampling of an amplitude of an interference signal received by at least one sensor in an elevation axis and by performing a spatial sampling of an amplitude of the interference signal received by at least one sensor in the azimuth axis.

9. The method according to claim 8, wherein:
each panel is inclined about an axis orthogonal to a plane of each panel, by an angle α formed with the vertical of between 20° and 70°.

10. The method according to claim 8, wherein the mobile platform transmits data through a radiofrequency channel to the aircraft using a transmitter, a power level for transmission by said transmitter being adjusted according to a distance measured between said mobile platform and the aircraft, such that the transmission power is reduced as the aircraft approaches the mobile platform.

11. The method according to claim 8, wherein, for each of the at least two passive sensors, the position of the aircraft is determined by triangulation of measurements obtained from at least two passive sensors, and the independently determined positions of the aircraft are combined to improve reliability of the determination of the position of said aircraft.

12. The method according to claim 8, wherein the signals transmitted from the aircraft and received by the at least two passive sensors of the mobile platform are single-frequency signals transmitted in band X or signals comprising a frequency-based comb of rays.

13. The method according to claim 8, wherein formulating the flight commands to orient the aircraft on its decking trajectory comprises receiving navigation data obtained from aircraft instruments.

* * * * *